(12) United States Patent
Fahrbach et al.

(10) Patent No.: US 11,022,788 B2
(45) Date of Patent: Jun. 1, 2021

(54) ILLUMINATION APPARATUS FOR A MICROSCOPE

(71) Applicant: Leica Microsystems CMS GmbH, Wetzlar (DE)

(72) Inventors: Florian Fahrbach, Mannheim (DE); Lars Friedrich, Weinheim (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 358 days.

(21) Appl. No.: 16/310,472

(22) PCT Filed: Jun. 21, 2017

(86) PCT No.: PCT/EP2017/065319
§ 371 (c)(1),
(2) Date: May 29, 2019

(87) PCT Pub. No.: WO2017/220699
PCT Pub. Date: Dec. 28, 2017

(65) Prior Publication Data
US 2019/0278072 A1    Sep. 12, 2019

(30) Foreign Application Priority Data

Jun. 23, 2016 (LU) .......................................... 93117

(51) Int. Cl.
*G02B 21/16* (2006.01)
*G02B 21/06* (2006.01)
*G02B 27/10* (2006.01)

(52) U.S. Cl.
CPC ............. *G02B 21/16* (2013.01); *G02B 21/06* (2013.01); *G02B 27/10* (2013.01)

(58) Field of Classification Search
None
See application file for complete search history.

(56) References Cited

U.S. PATENT DOCUMENTS 10,095,017 B2    10/2018    Anhut et al.
2002/0141052 A1*  10/2002   Iketaki .................. G02B 27/58
                                                        359/386

(Continued)

FOREIGN PATENT DOCUMENTS

DE      4416558 A1    8/1995
DE     10257423 A1    6/2004

(Continued)

*Primary Examiner* — Derek S. Chapel
(74) *Attorney, Agent, or Firm* — . Leydig, Voit & Mayer, Ltd.

(57) ABSTRACT

An illumination apparatus for a microscope, for producing a de-excitation or switching light distribution, includes a light source configured to produce a primary illumination light beam and a beam splitter configured to divide the primary illumination light beam into two partial illumination light beams. An illumination objective is configured to focus the partial illumination light beams onto and/or into a sample such that the partial illumination light beams extend, spatially separated from one another, through an entry pupil of the illumination objective and are spatially superposed on and/or in the sample after passing through the illumination objective. A phase influencer is configured to cause a relative phase offset of the partial illumination light beams with respect to one another in such a way that the partial illumination light beams in the entry pupil of the illumination objective have a phase offset of $\pi$.

24 Claims, 6 Drawing Sheets

(56) References Cited

U.S. PATENT DOCUMENTS

| | | | |
|---|---|---|---|
| 2006/0033987 A1 | 2/2006 | Stelzer et al. | |
| 2009/0237765 A1 | 9/2009 | Lippert et al. | |
| 2010/0157422 A1* | 6/2010 | Ouchi | G02B 21/365 |
| | | | 359/385 |
| 2011/0215258 A1 | 9/2011 | Kempe et al. | |
| 2012/0098949 A1 | 4/2012 | Knebel et al. | |
| 2013/0335819 A1* | 12/2013 | Cooper | G02B 21/14 |
| | | | 359/389 |
| 2016/0131885 A1* | 5/2016 | Nakayama | G01N 21/64 |
| | | | 250/458.1 |

FOREIGN PATENT DOCUMENTS

| | | |
|---|---|---|
| DE | 102007015063 A1 | 10/2008 |
| DE | 102010060121 A1 | 4/2012 |
| DE | 102012010207 A1 | 11/2013 |

* cited by examiner

ILLUMINATION APPARATUS FOR A MICROSCOPE

CROSS-REFERENCE TO PRIOR APPLICATIONS

This application is a U.S. National Stage Application under 35 U.S.C. § 371 of International Application No. PCT/EP2017/065319 filed on Jun. 21, 2017 and claims benefit to Luxembourgian Patent Application No. LU 93117 filed on Jun. 23, 2016. The International Application was published in German on Dec. 28, 2017 as WO 2017/220699 A1 under PCT Article 21(2).

FIELD

The invention relates to an illumination apparatus for a microscope for producing a de-excitation or switching light distribution with a light source that produces a primary illumination light beam.

The invention also relates to a microscope with such an illumination apparatus and to a method for imaging—in particular, for super-resolution imaging—a sample using a microscope with such an illumination apparatus.

BACKGROUND

SPIM (single plane illumination microscopy) technology, wherein illumination of the sample takes place in layers perpendicularly to the detection axis, allows faster and more sample-sparing acquisition of image data than, for example, in a point-by-point scanning of a sample. One known field of application of SPIM technology is the field of fluorescence microscopy, wherein fluorophores in the sample are excited with laser light. In SPIM technology, excitation thereby takes place only in an illumination light sheet (also called a light strip). Damage to the sample by illumination light in other planes is thereby avoided.

An optical device operating according to the SPIM method is described in DE 102 57 423 A1. In this microscope, a sample is illuminated with a thin light sheet, while observation takes place from a direction perpendicular to the plane of the illuminating light sheet. In this case, illumination and detection are effected via two separate optical beam paths, each with separate optics. The light sheet is produced by a cylindrical lens. For image acquisition, the sample is moved through the light sheet, which is fixed with respect to the detector, in order to record, layer-by-layer, fluorescence light and/or scattered light with a flat detector. The layer image data thus obtained can subsequently be combined to form a data set corresponding to a three-dimensional image of the sample.

DE 10 2007 015 063 A1 discloses an optical arrangement with a light source for emitting a light beam and with optical elements for converting this light beam into the form of a light sheet. The optical arrangement is particularly suitable for illuminating individual planes of a three-dimensional sample in selective plane illumination microscopy (SPIM). Means are provided for varying the cross-section of the light sheet, for varying the length of the light sheet, and/or for influencing the direction of the radiation portions extending within the light sheet, in order to be able to adapt the geometry of the light sheet to the illumination requirements when observing one and the same sample plane with several objectives of various kinds.

An arrangement for increasing the resolution capability for fluorescence applications is known from DE 44 16 558. In this case, the lateral edge regions of the focal volume of the excitation light beam are illuminated with a light beam of a different wavelength—the so-called stimulation light beam or de-excitation beam—which is emitted by a second laser, in order to thereby bring the sample regions excited by the light of the first laser back into the ground state by stimulated emission. Only then is the spontaneously emitted light from the regions not illuminated by the second laser detected, so that, overall, a resolution improvement is achieved. The term, STED (stimulated emission depletion), has been adopted for this method.

From DE 10 2010 060 121 A1, an SPIM microscope is known which is provided with a y-directional illumination source and a z-directional detection light camera. An x scanner produces a sequential light sheet by scanning the illumination light beam in the x-direction. The focal length of the illumination light beam can be varied by means of illumination optics with zoom optics arranged in the beam path of the illumination light beam. According to one embodiment, an STED (STED=stimulated emission depletion) de-excitation beam can be optionally connected, wherefore a de-excitation light source is provided which sends a de-excitation light beam from the y-direction onto the object to be imaged, wherein the de-excitation light beam dilutes the sequentially produced light sheet in the z-direction, is transmitted onto the object with a lateral offset in the z-direction from the illumination light beam and, in parallel to the illumination light beam, scanned in the x-direction. The de-excitation beam is preferably a de-excitation beam that was modified in its cross-section in such a way that it has 2 maxima which, when viewed in the z-direction, lie in front of and behind the center of the excitation beam, and the de-excitation beam there has a zero point. However, it is also possible to provide two separate laser beams as de-excitation beams on both sides of the excitation beam, or to dilute the light sheet with only one de-excitation beam on only one side, i.e., to apply a de-excitation beam only in front of or behind the excitation beam when viewed in the z-direction.

STED-like approaches, such as, for example, GSD (ground state depletion) or RESOLFT (reversible saturable optical (fluorescence) transitions) also aim at achieving imaging or structure production below the diffraction limit with visible light by suppressing the emission of fluorescence in the edge region of the excitation light beam by switching or transitioning the fluorophores into the dark state.

In order to achieve super-resolution by means of STED/RESOLFT/GSD microscopy, a symmetric, annular beam is usually produced, with which the fluorophores are prevented, by means of stimulated emission (STED), ground state depletion/transitioning the fluorophores into a (dark) triplet state (GSD), or by molecular conformational change/switching (RESOLFT), from absorbing the incident photons having a second wavelength and/or from then emitting fluorescence. In this case, an element centrally located on the optical axis is typically used which correspondingly manipulates the de-excitation or switching beam in such a way that a symmetrical, annular beam is produced in the region of the sample as a result.

SUMMARY

In an embodiment, the present invention provides an illumination apparatus for a microscope for producing a de-excitation or switching light distribution. The illumination apparatus includes a light source configured to produce a primary illumination light beam and a beam splitter configured to divide the primary illumination light beam into two partial illumination light beams. An illumination objective is configured to focus the partial illumination light beams onto and/or into a sample such that the partial illumination light beams extend, spatially separated from one another, through an entry pupil of the illumination objective and are spatially superposed on and/or in the sample after passing through the illumination objective. At least one phase influencer is configured to cause a relative phase offset of the partial illumination light beams with respect to one another in such a way that the partial illumination light beams in the entry pupil of the illumination objective have a phase offset of π.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 a schematic representation of an exemplary embodiment of an illumination apparatus according to the invention, FIGS. 2a-2c an exemplary embodiment concerning the production of a de-excitation or switching light distribution for line-scanning systems (DSLM), FIGS. 3a-3c an exemplary embodiment relating to the production of a de-excitation or switching light distribution for static illumination (SPIM), FIG. 4 an advantageous intensity distribution of excitation light and de-excitation or switching light, FIG. 5 a suboptimal intensity distribution of excitation light and de-excitation or switching light, FIG. 6 a schematic representation of a possible structure for producing two partial illumination light beams with the phase difference πr, FIG. 7 an illustration for explaining the functional principle of the phase grating shown in FIG. 6, and FIG. 8 the intensity distributions in different cross-sectional planes with respect to the exemplary embodiment shown in FIG. 6.

DETAILED DESCRIPTION

To date, no method has been presented which produces a de-excitation or switching beam in such a way that it is optimized for the special requirements in an SPIM microscope. These requirements would, on the one hand, be the de-excitation or switching only on two sides of the excitation beam (i.e., exclusively above and below the light sheet)—preferably in connection with an illumination direction perpendicular to the detection axis and a large—in particular, flexibly adjustable—depth of field and, independently thereof, an adjustable thickness and an adjustable distance between the two excitation/switching beams, which are adapted to the geometry of the (excitation) light sheet.

Embodiments of the present invention provide an illumination apparatus for producing a de-excitation or switching light distribution which is flexibly adjustable and can be adapted, in particular, to the special requirements of an SPIM microscope.

According to an embodiment, an illumination apparatus of the type mentioned at the beginning comprises:
 a. a beam-splitting apparatus which splits the primary illumination light beam into two partial illumination light beams,
 b. an illumination objective which focuses the partial illumination light beams onto and/or into a sample, wherein the partial illumination light beams extend, spatially separated from one another, through the entry pupil of the illumination objective and are spatially superposed on and/or in the sample after passing through the illumination objective, and
 c. at least one phase-influencing means which causes a relative phase offset of the partial illumination light beams with respect to one another in such a way that the partial illumination light beams in the entry pupil of the illumination objective have a phase offset of π.

As is explained in detail below, the illumination apparatus according to an embodiment of the invention has the very special advantage that the de-excitation or switching light distribution produced with it in the region of the sample can be easily and efficiently adapted to the respective specific requirements—in particular, in the case of an SPIM microscope.

An important feature according to an embodiment of the invention is to thereby produce the de-excitation or switching light distribution by interference of two partial illumination light beams which extend separately from one another through the entry pupil of the illumination objective, and which spatially superpose on and/or in the sample after passing through the illumination objective. The spatial distance between the partial illumination light beams in the region of the entry pupil results in the partial illumination light beams being tilted relative to one another after passing through the illumination objective, and thus penetrating into the sample volume. By the relative phase offset of the partial illumination light beams by π, the interference pattern resulting in the region of the superposition has a zero point along the optical axis. As is explained in detail below, it is, in particular, also possible to design the de-excitation or switching light distribution for de-excitation or switching of dyes in SPIM microscopy in such a way that it has a planar zero point in the region of the spatial superposition of the partial illumination light beams along a plane in which the optical axis lies.

It is usually the case that the only thing to be detected is the fluorescent light which originates from the region in which the interference pattern or the de-excitation and/or switching light distribution has a zero point, wherein a zero point is, in particular, also present in the sense of an embodiment of the present invention if the light intensity is not exactly zero due to technical imperfections. In this respect, the invention is, in particular, based upon the idea of minimizing the number of fluorophores to be de-excited (intensity minimum). The following therefore also in part refers, synonymously, to an intensity minimum instead of to a zero point.

In contrast to known approaches, the phase offset by π is preferably not impressed centrally on a single illumination light beam. Rather, from a primary illumination light beam are produced, according to an embodiment of the invention, two, initially spatially separated, partial illumination light beams, which have a phase offset of π relative to one another in the entry pupil of the illumination objective and which then are brought to interference on the sample or in the sample volume.

In this case, it is possible, for example, for the phase-influencing means and the beam-splitting apparatus to be formed by the same optical component, wherein, moreover, it can be provided, in particular, for the optical component to effect both the splitting of the primary illumination light beam into the two partial illumination light beams and the relative phase offset of the partial illumination light beams with respect to one another.

Alternatively, it is also possible for the phase-influencing means to be arranged as a component, separate from the beam-splitting apparatus, in the beam path of one of the partial illumination light beams. For example, a correspondingly suitable optical element need be arranged for this purpose only in the path of one of the partial illumination light beams.

In a particular embodiment, each of the partial illumination light beams respectively extends through its own one of two crescent-shaped parts of the entry pupil. It can, particular advantageously, in this case be provided for the crescent-shaped part with the respective partial illumination light beam to be under-illuminated, which can, for example, be achieved by each partial illumination light beam in the region of the entry pupil having a diameter that is smaller than the radius of the entry pupil. Preferably, the entry pupil is not fully illuminated.

The phase difference of $\pi$ can, for example, be caused—as is explained in more detail below—by a phase plate—in particular, arranged in the entry pupil—with two, optically different, retarding segments, wherein one of the partial illumination light beams extends through one segment, and the other partial illumination light beam extends through the other segment.

In a particularly advantageous manner, the phase plate can be firmly installed in the illumination objective. In light sheet microscopy, this structural integration is possible, in particular, in that, unlike in confocal microscopy, the illumination objective is typically not also used for detection. When installed in an objective used for detection, the phase plate would otherwise have an adverse effect on image quality.

It is, for instance, also possible, as also explained in more detail below, to produce a phase offset of the two partial illumination light beams of $\pi$ by the two partial illumination light beams completing, relative to one another, a different number of reflections on respectively a metal surface or total resections, the numbers differing by an odd number—in particular, by one. Use is made here of the fact that light which is reflected on a metal surface experiences a phase shift of $\pi$.

Particularly easy to implement is an embodiment in which the partial illumination light beams extend in parallel to one another in the region of the entry pupil and/or wherein the propagation directions of the partial illumination light beams in the region of the entry pupil are aligned in parallel to one another.

However, it is also possible for the partial illumination light beams in the region of the entry pupil to not extend in parallel to one another. If the partial illumination light beams in the pupil do not extend in parallel to the optical axis, they also do not interfere in, but rather, before or behind, the focal plane of the illumination objective (in the Fourier plane). To this extent, an axial displacement of the focus can, advantageously, be achieved by tilting the partial illumination light beams.

It is also, advantageously, possible for the partial illumination light beams to not be coupled into the illumination objective symmetrically with respect to the optical axis and/or tilted relative to one another. In this way, an asymmetrical interference pattern can be achieved, which may be desirable for certain examination situations.

In a very particularly advantageous embodiment of the illumination apparatus according to the invention, at least one adjusting means is provided, with which the position of the partial illumination light beams in the region of the entry pupil, and/or the position of at least one of the partial illumination pupils relative to the optical axis of the illumination light objective, and/or the shape of the partial illumination light beam in the region of the entry pupil, and/or the divergence of the partial illumination light beams in the region of the entry pupil, and/or the distance between the partial illumination light beams in the region of the entry pupil, and/or the diameter of the partial illumination light beams in the region of the entry pupil can be adjusted.

In the region of the sample, the two partial beams form a strip-shaped interference pattern. The distance and the dimensions of the partial beams in the pupil can, in particular, be selected to be fixed, or be freely adjustable.

In a particular case, the diameter and distance between the partial illumination light beams are adapted to one another such that the interference pattern of the two partial beams consists of only two intensity maxima lying symmetrically around a zero point.

For example, the beam diameter may be increased in order to increase the width of the interference pattern. The number of intensity maxima and zero points increases, wherein the intensity reached in the maxima decreases symmetrically towards the edge.

For example, by adjusting the distance between the two partial illumination light beams in the region of the pupil, the distance between the neighboring maxima or the period of the interference pattern of the two partial beams can be adjusted.

By selecting the position of the two partial beams relative to the center of the entry pupil, the excitation or switching light distribution can be tilted relative to the optical axis of the illumination objective.

Furthermore, it is, for example, possible to adjust the depth of field of the de-excitation or switching light distribution by adjusting the beam diameter of at least one of the partial illumination light beams.

In an advantageous embodiment, the adjusting means—in particular, for adjusting the distance and/or the positions of the partial illumination light beams—has at least one beam-deflecting element that is adjustable with respect to the deflection angle caused. This can, for example, be a tiltably-mounted mirror. An embodiment in which the beam-deflecting element has at least one remote-controlled, motor-movable mirror is of particular advantage. Alternatively or additionally, it is also possible for the adjusting means—in particular, for adjusting the distance and/or the positions of the partial illumination light beams—to have at least one tiltably-mounted and/or remote-controlled, motor-movable grating. In particular, the adjusting means can be designed to effect a beam offset—in particular, a parallel offset. For this purpose, the adjusting means may, for example, have a rotatably-mounted, plane-parallel plate or two tiltable mirrors connected in series in the beam path of one of the partial illumination light beams.

In a particular embodiment, the adjusting means—in particular, for adjusting the distance and/or the positions of the partial illumination light beams—has at least one active optical element. This can, for example, be an SLM (spatial light modulator) or a DMD (digital micromirror device).

In a most advantageous embodiment, which allows rapid and flexible adjustment, the adjusting means—in particular, for adjusting the distance and/or the position of the partial illumination light beams—has at least one acousto-optical component. For example, the acousto-optical component can be designed as an AOD (acousto-optical deflector) or as an AOM (acousto-optical modulator). In particular, the adjusting means can also have an AOTF (acousto-optical tunable filter) which is controlled such that, by changing the polarization of the first diffraction order relative to the zeroth diffraction order, a following polarization-dependent phase delay by means of a birefringent material is effected.

Alternatively or additionally, it is also possible for the adjusting means—in particular, for adjusting the distance and/or the position of the partial illumination light beams—to have two diaphragms which are adjustable in terms of their distance and/or in terms of their position and arranged in the entry pupil of the illumination objective or in a plane conjugated to the entry pupil. In this case, the process can advantageously be such that the diaphragms are over-illuminated with the partial illumination light beams, so that only the part of the partial illumination light beams passing through the diaphragms reaches the illumination objective. By displacing one of the diaphragms, the part of the respective partial illumination light beam reaching the illumination objective thus also moves. In particular, the diaphragms can, additionally, also be designed to be adjustable with regard to their aperture diameter. The diaphragms may, for example, be iris diaphragms. The lateral dimensions of the partial illumination light beams can, advantageously, also be adjusted with such diaphragms. The diaphragms—in particular, iris diaphragms—can also be integrated into the illumination objective.

In a particular embodiment, the adjusting means—in particular, for adjusting the lateral dimensions, and, in particular, the diameter of the partial illumination light beams—has a beam expander, which is adjustable—in particular, in a remote-controlled manner—with respect to the enlargement, in the beam path of at least one of the partial illumination light beams. Alternatively or additionally, it may also be provided for the adjusting means—in particular, for adjusting the lateral dimensions of the partial illumination light beams—to have at least one lens with variable focal length.

In a particular embodiment, the partial illumination light beams are collimated in the region of the entry pupil. However, it is also possible for the partial illumination light beams to extend convergently or divergently in the region of the entry pupil. Particularly advantageous is an embodiment of the illumination apparatus in which the convergence or divergence of the partial illumination light beams can be adjusted by means of an adjusting means. By adjusting the convergence or divergence of the partial illumination light beams, the position of the beam waist of the de-excitation or switching light distribution can be shifted relative to the focal plane of the illumination objective.

The partial illumination light beams can be designed—in particular, in the entry pupil—as Gaussian light beams. However, this is not absolutely necessary. For example, the partial illumination light beams can, alternatively, also be designed as flat top beams.

A particularly robust and simple-to-implement approach for producing the two partial illumination light beams consists in arranging a binary grating in a plane conjugated to the focal plane of the illumination objective. The binary grating can be thought of as a superposition of two blazed gratings, the phases of which extend in opposite directions and are shifted by $\pi$, relative to one another. Such binary gratings may be produced simply as static, diffractive elements, wherein a distance between the partial illumination light beams suitable for the desired application can be produced by correspondingly selecting and/or adjusting the period of the grating. Such a grating in an embodiment as a modulator (e.g., LCoS SLM or ferroelectric SLM) represents a particularly flexible solution for adjusting the distance between the partial illumination light beams in the pupil. In addition, the modulator, with a suitable technical design, can also be capable of changing the amplitude of the partial illumination light beams. The depth of field of the de-excitation or switching light distribution could thus be flexibly adjusted by a modulator.

In general, it can, advantageously, be provided that the beam-splitting apparatus have at least one grating and/or that the beam-splitting apparatus have at least one phase grating. In particular, it can advantageously also be provided that the beam-splitting apparatus have a binary grating and/or that the beam-splitting apparatus have a superposition grating which corresponds to the superposition of two gratings oriented in opposite directions with regard to their phase delay distribution. Of particular advantage is an embodiment in which the beam-splitting apparatus has a grating that can be adjusted with regard to the grating period.

Particularly for SPIM applications, the partial illumination light beams in the region of the sample and/or region of the entry pupil can be formed, in cross-section, elliptically and/or as a light sheet. This can be achieved by, for example, the use of anamorphic optics in the beam path. For example, a laser beam having a cylindrical lens may be imaged onto the grating.

Particularly advantageous is a microscope that has an illumination apparatus according to the invention. Such a microscope may have a further light source (2) which produces an excitation light beam for illuminating the sample. The excitation light beam serves to cause fluorescence excitation in the sample. As an alternative to a further light source (2), it can also be provided that the light source (2), which already provides the light for the de-excitation or switching light distribution, additionally also produce the excitation light. In particular, the light source (2) can be designed for this purpose as a multi-wavelength light source—in particular, as a white light source.

The excitation light beam can, in particular, be formed as an excitation light sheet. In order to produce super-resolution, it can, advantageously, be provided that the de-excitation or switching light distribution have two de-excitation or switching light sheets which are parallel to the excitation light sheet and arranged on both sides of the excitation light sheet. As already mentioned, the distance between these two de-excitation or switching light sheets can be adjusted by adjusting the distance between the partial illumination light beams, wherein the depth of field of the de-excitation light sheet can be compensated for by suitably changing the diameter of the partial illumination light beams in the pupil.

In order to produce a super-resolution image of a sample, fluorescence excitation of the sample is caused using the excitation light beam designed, in particular, as an excitation light sheet, while a stimulated emission and/or a ground state depletion or a conformity change or a switching of fluorophores (in the edge region of the excitation light sheet) is caused with the de-excitation or switching light distribution.

Embodiments of the invention are shown schematically and by way of example in the drawings and described below with reference to the figures, wherein identical or identically-acting elements are usually provided with the same reference numerals, even in different exemplary embodiments.

Figure 1:
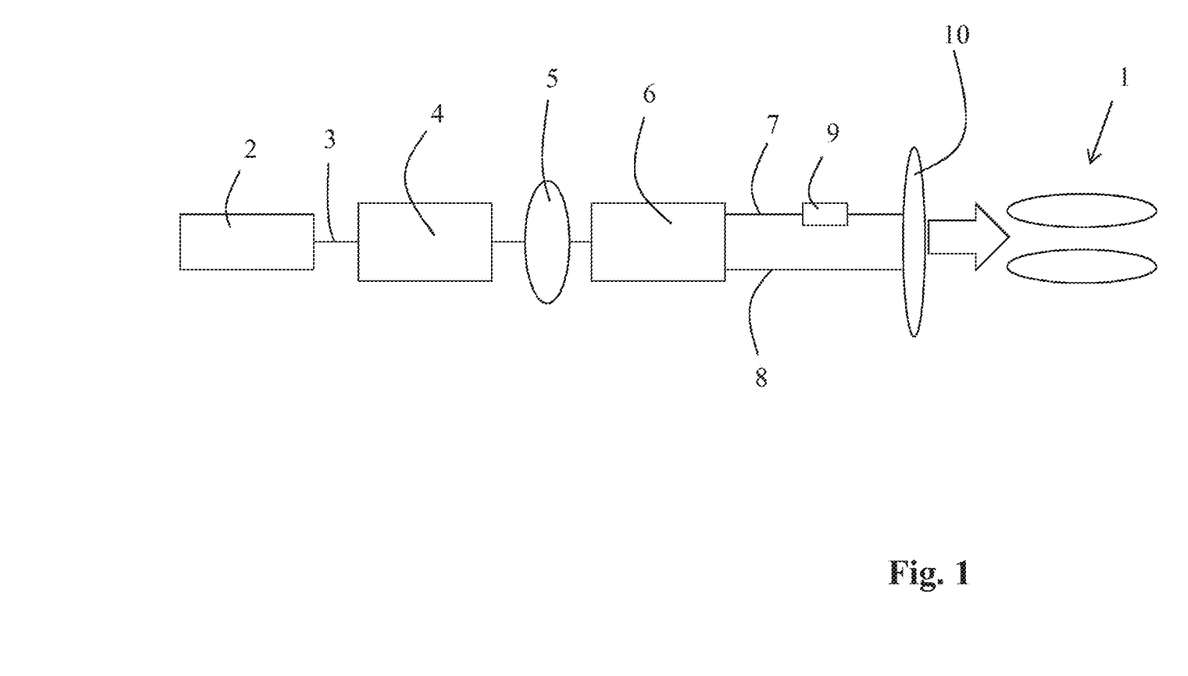

FIG. 1 shows a schematic representation of an exemplary embodiment of an illumination apparatus according to the invention for a microscope for producing an excitation or switching light distribution 1. The illumination apparatus includes a light source 2, which may, for example, be designed as a laser and which produces a primary illumination light beam 3. A variable beam expander 4 and a cylindrical optical system 5 are arranged downstream of the light source 2. The cylindrical optical system 5 gives the primary illumination light beam 3 a light-sheet-like shape.

Downstream of the cylindrical optical system 5 is arranged a beam-splitting apparatus 6 which spatially divides the primary illumination light beam 3 into a first partial illumination light beam 7 and a second partial illumination light beam 8. Arranged in the beam path of the first partial illumination light beam 7 is a phase-influencing means 9 which influences the phase of the first partial illumination light beam 7 such that the two partial illumination light beams 7, 8 have a phase offset of π in the region of their subsequent spatial superposition. The illumination apparatus has an illumination objective 10 which focuses the partial illumination light beams 7, 8 onto and/or into a sample (not shown in FIG. 1), wherein the partial illumination light beams 7, 8 extend, spatially separated from one another, through the entry pupil of the illumination objective 10 and are spatially superposed on and/or in the sample after passing through the illumination objective 10, so that the desired de-excitation or switching light distribution 1 arises as a result of interference.

The schematically illustrated illumination apparatus is particularly suitable for use in an SPIM microscope. It is of course also possible to produce a de-excitation or switching light distribution for a line-scanning system (DSLM). A cylindrical optical system 5 can, in particular, be dispensed with in this case.

Figure 2A:
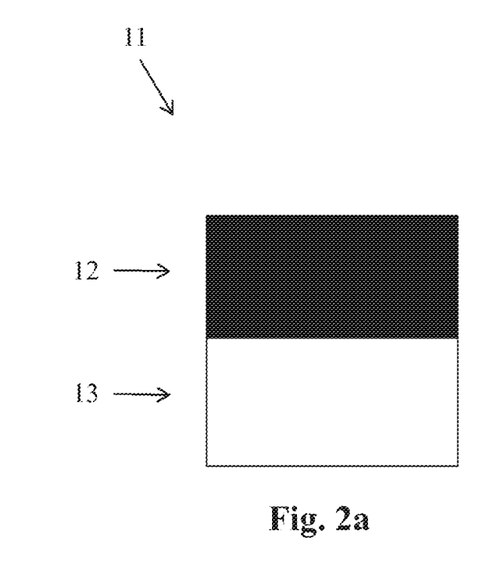

FIG. 2 shows an exemplary embodiment relating to the production of a de-excitation or switching light distribution 1 for a line-scanning system, wherein the phase plate 11 arranged in the entry pupil of the illumination objective is shown schematically in FIG. 2a. The phase plate 11 has two segments 12, 13, wherein the segments 12, 13 are designed differently relative to one another, viz., such that light that extends through the first segment 12 has a phase difference of π relative to light that extends through segment 13. In this respect, phase 0 can be assigned to the first segment 12, and phase π can be assigned to the second segment 13.

Figure 2B:
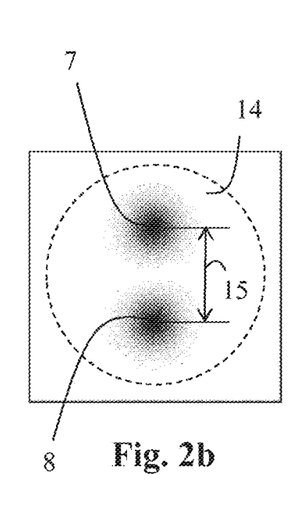

FIG. 2b shows a plan view of the plane of the entry pupil of the illumination objective 10 and illustrates the intensity distribution of the partial illumination light beams 7, 8 at the location of the entry pupil of the illumination objective 10. While the first partial illumination light beam 7 extends through the first segment 12 of the phase plate 11, the second partial illumination light beams 8 extends through the second segment 13 of the phase plate 11. It can be seen clearly that each partial illumination light beam 7, 8 in the region of the entry pupil has a diameter that is smaller than the radius of the entry pupil 14. The partial illumination light beams 7, 8 have a relative distance 15 with respect to one another in the z-direction.

Figure 2C:
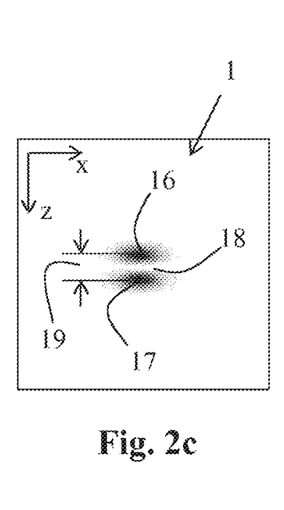

FIG. 2c shows the intensity distribution of the de-excitation or switching light distribution (perpendicular to the propagation direction along the y-axis) resulting from the interference of the two partial illumination light beams 7, 8 after passing through the illumination objective. It can be seen that the de-excitation or switching light distribution 1 has two intensity maxima 16, 17, between which an intensity minimum 18 is located. The distance 19 between the intensity maxima 16, 17 can be adjusted by changing the distance between the partial illumination light beams 7, 8 at the location of the entry pupil 14. By adjusting the diameters of the partial illumination light beams 7, 8 in the region of the entry pupil 14, the width of the intensity maxima 16, 17 of the de-excitation or switching light distribution adjoining the central intensity minimum 18 can be adjusted.

Figure 3A:
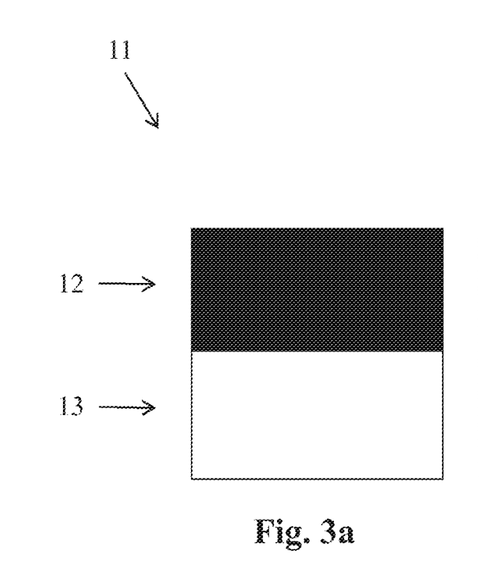
Figure 3B:
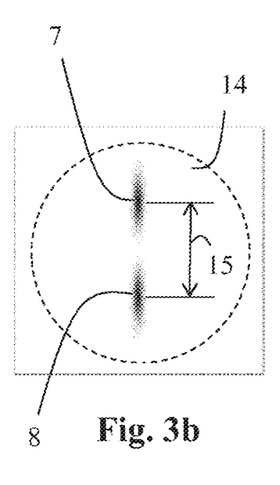
Figure 3C:
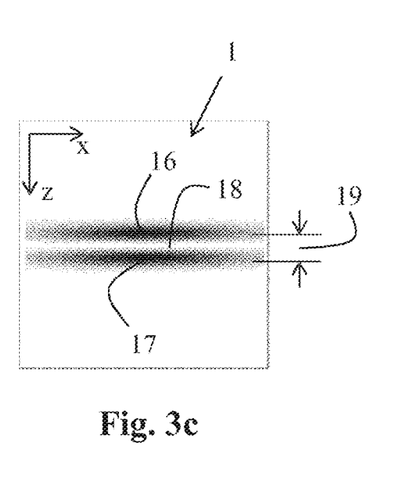

FIGS. 3a through 3c illustrate, by way of example, the production of a de-excitation or switching light distribution 1 for static illumination—in particular, in SPIM microscopy. For this purpose, just as with respect to the embodiment according to FIGS. 2a through 2c, a phase plate 11 that has two segments 12, 13 and causes a phase difference of the partial illumination light beams 7, 8 of π is used in the entry pupil of the illumination objective 10. By using a cylindrical optical system, light-sheet-like partial illumination light beams 7, 8 can be produced in the entry pupil 14. Alternatively, it is also possible for partial illumination light beams which are circular in cross-section to be routed back and forth, by means of at least one beam deflection device that can be adjusted with respect to the deflection angle, such that they are in fact indistinguishable from a light sheet produced with a cylindrical optical system.

FIG. 3c shows the intensity distribution of the de-excitation or switching light distribution 1 which develops in the sample as a result of interference of the partial illumination light beams 7, 8 after passing through the illumination objective. The de-excitation or switching light distribution 1 has two intensity maxima 16, 17, which are designed to be light-sheet-like (parallel to the X-Y plane). A planar intensity minimum 18 is located between the two intensity maxima 16, 17. In particular, it can advantageously be provided that a sample be illuminated with an excitation light sheet in order to cause fluorescence excitation, which light sheet is arranged in the region of the intensity minimum 18 of the de-excitation or switching light distribution 1 and is superposed on both sides by the in-parallel-arranged intensity maxima 16, 17 of the de-excitation or switching light distribution 1 in order to restrict the emission of fluorescent light along z and, in particular, to achieve super-resolution, i.e., a resolution above the classical limitation of light microscopy, along z. It also applies in this case that the distance 19 between the intensity maxima can be adjusted by adjusting the distance 15 between the partial illumination light beams 7, 8.

Figure 4:
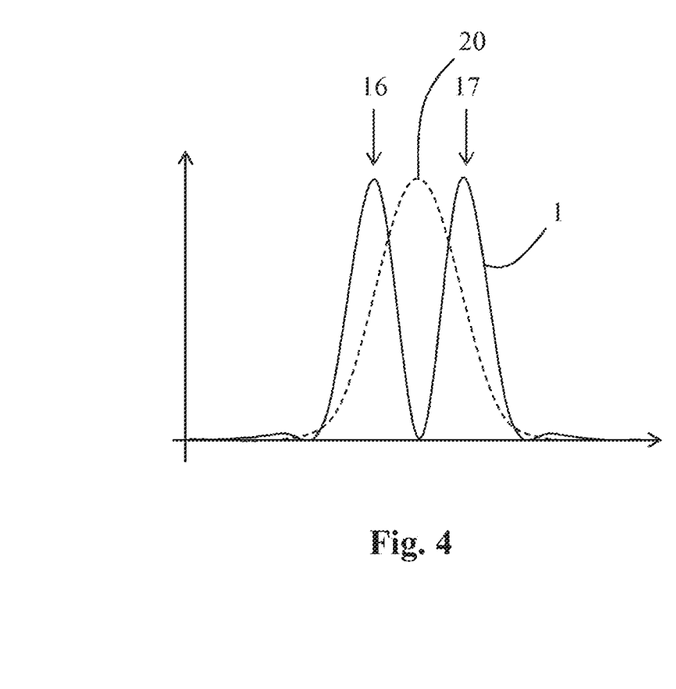

FIG. 4 shows by way of example an advantageous combination of excitation light distribution 20 and of de-excitation or switching light distribution 1. The intensity is plotted as a function of the location. It can be seen that the width of the de-excitation or switching light distribution 1 covers the entire width of the excitation light distribution 20.

Figure 5:
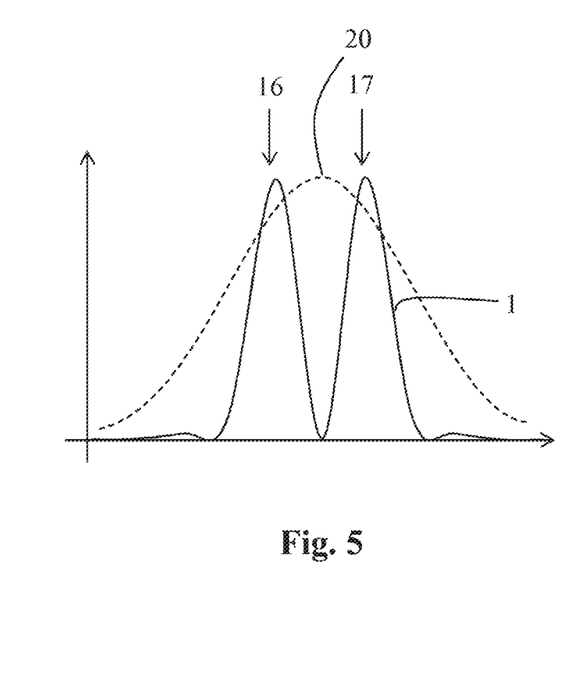

In contrast, FIG. 5 shows a suboptimal adaptation of the distribution of excitation light 20, on the one hand, and of de-excitation or switching light 1. It can be seen that the width of the de-excitation or switching light distribution 1 that is too narrow does not cover the entire width of the excitation light distribution 20, so that fluorescence radiation caused by the excitation light is, disadvantageously, to be expected from the regions laterally outside the two intensity maxima of the de-excitation or switching light distribution 1, which negatively influences the goal of achieving super-resolution.

By adjusting the distance between the partial illumination light beams 7, 8 in the entry pupil 14 of the illumination objective 10, the distance between the maxima 16, 17 of the de-excitation or switching light distribution 1 and the slopes of the flanks of the de-excitation or switching light distribution 1 can be adjusted. A very particular advantage thereof is that the depth of field can be adjusted independently of the distance between the maxima 16, 17.

Figure 6:
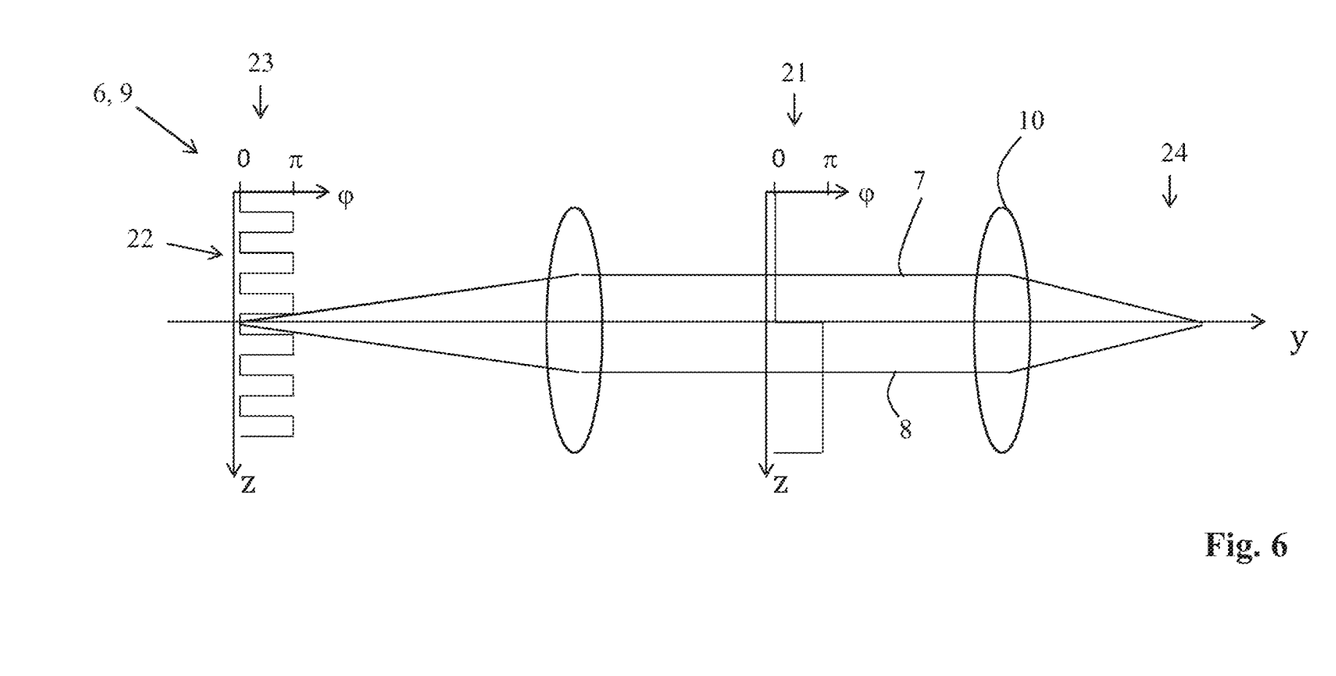

FIG. 6 shows a very schematic representation of a possible structure for producing two partial illumination light beams 7, 8 which have a phase difference of π relative to one another.

In this structure, the phase-influencing means 9 and the beam-splitting apparatus 6 are formed by the same optical component, viz., by a rectangular phase grating 22, wherein the rectangular phase grating 22 causes both the division of the primary illumination light beam 3 into the two partial illumination light beams 7, 8 and the relative phase offset of the partial illumination light beams 7, 8 with respect to one another. The rectangular phase grating 22 is arranged in a first plane 23.

Figure 7:
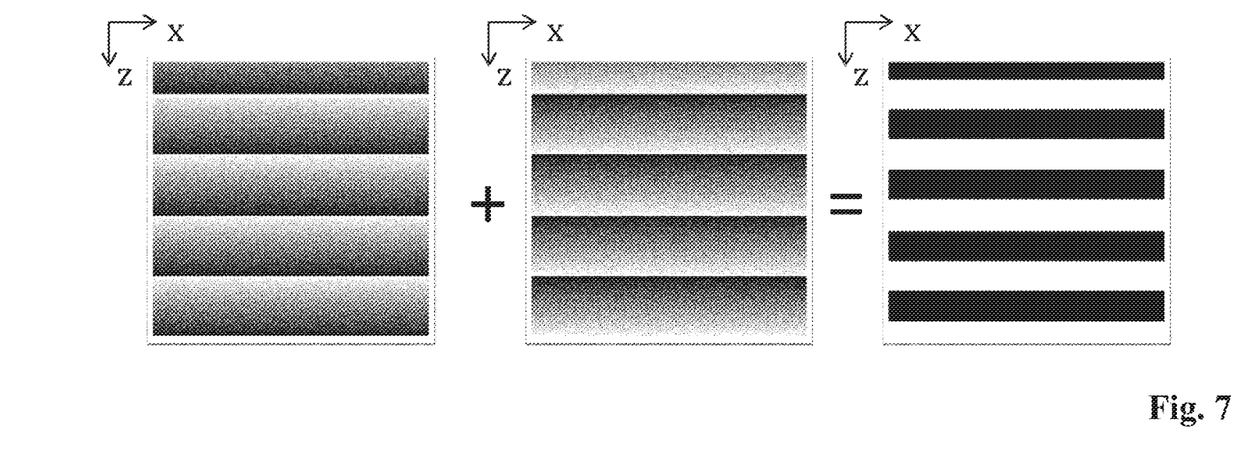

The rectangular phase grating 22 can be designed as a binary grating. The binary grating can be thought of as a superposition of two blazed gratings, the phases of which extend in opposite directions and are shifted by π relative to one another, which is shown in FIG. 7. The first plane 23 is a plane corresponding to the focal plane 24 of the illumination objective 10, while the plane 21 of the entry pupil of the illumination objective 10 is a Fourier plane corresponding to the first plane 23 and to the focal plane 24.

Visually, the functioning of the rectangular phase grating 22 can be illustrated as follows: If a prism is envisaged in a first thought instead of the rectangular phase grating 22, it becomes clear that such a prism would deflect the incident primary illumination light beam away from the optical axis. In a next thought, the prism can be replaced by a Fresnel prism consisting of a plurality of shorter prisms of equal size. This has the same effect of deflecting the primary illumination light beam away from the optical axis. A Fresnel prism rotated by 180° would deflect the incident primary illumination light beam in the opposite direction away from the optical axis.

The Fresnel prisms can be replaced by phase gratings, which are represented with regard to the phase delay they produce as in FIG. 7, wherein different gray levels represent a different phase delay (black=phase delay π, white=phase delay 0). The addition of these phase distributions results in the rectangular phase grating 22, shown on the right in FIG. 7, which is arranged in plane 23.

Instead of the rectangular phase grating 22, an acousto-optical grating, which can be produced, for example, with an AOD, could also be used.

Figure 8:
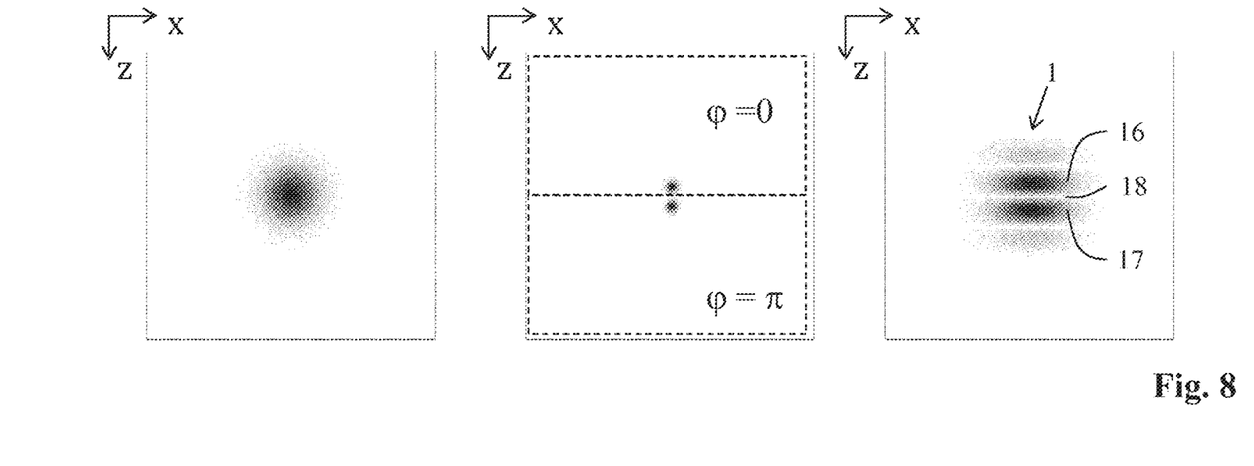

In FIG. 8, the intensity distribution of the primary illumination light beam in the first plane 23 is illustrated on the very left, while the middle depiction of FIG. 8 illustrates the intensity distribution of the partial illumination light beams 7, 8 which are phase-shifted relative to one another by π.

In FIG. 8, the de-excitation or switching light distribution 1 in the focal plane 24 is shown on the very right. It can be seen that the produced de-excitation or switching light distribution 1 has two intensity maxima 16, 17, between which an intensity minimum 18 is arranged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 De-excitation or switching light distribution
2 Light source
3 Primary illumination light beam
4 Variable beam expander
5 Cylindrical optical system
6 Beam-splitting apparatus
7 First partial illumination light beam
8 Second partial illumination light beam
9 Phase-influencing means
10 Illumination objective
11 Phase plate
12 First segment
13 Second segment
14 Entry pupil
15 Distance between the partial illumination light beams 7, 8
16 Intensity maximum
17 Intensity maximum
18 Intensity minimum
19 Distance between the intensity maxima 16, 17
20 Intensity distribution of the excitation light
21 Plane of the entry pupil of illumination objective 10
22 Rectangular phase grating
23 First plane
24 Focal plane

The invention claimed is:

1. An illumination apparatus for a microscope for producing a de-excitation or switching light distribution, the illumination apparatus comprising:
   a light source configured to produce a primary illumination light beam;
   a beam splitter configured to divide the primary illumination light beam into two partial illumination light beams;
   an illumination objective configured to focus the partial illumination light beams onto and/or into a sample such that the partial illumination light beams extend, spatially separated from one another, through an entry pupil of the illumination objective and are spatially superposed on and/or in the sample after passing through the illumination objective; and at least one phase influencer configured to cause a relative phase offset of the partial illumination light beams with respect to one another in such a way that the partial illumination light beams in the entry pupil of the illumination objective have a phase offset of π.

2. The illumination apparatus according to claim 1, wherein:
   a. each partial illumination light beam extends through its own a respective one of two crescent-shaped parts of the entry pupil, and/or
   b. each partial illumination light beam respectively extends through a crescent-shaped part of the entry pupil, wherein the crescent-shaped part is respectively under-illuminated by the partial illumination light beam, and/or
   c. each partial illumination light beam in the region of the entry pupil has a diameter that is smaller than the radius of the entry pupil, and/or
   d. the partial illumination light beams do not fully illuminate the entry pupil.

3. The illumination apparatus according to claim 1, wherein the partial illumination light beams extend in parallel to one another in the region of the entry pupil and/or propagation directions of the partial illumination light beams in the region of the entry pupil are aligned in parallel to one another.

4. The illumination apparatus according to claim 1, further comprising at least one adjuster configured to adjust:
   a. the position of the partial illumination light beams in the region of the entry pupil, and/or
   b. the position of at least one of the partial illumination light beams relative to the optical axis of the illumination objective, and/or
   c. the shape of the partial illumination light beams in the region of the entry pupil, and/or
   d. the divergence of the partial illumination light beams in the region of the entry pupil, and/or
   e. the distance between the partial illumination light beams in the region of the entry pupil, and/or
   f. the diameter of the partial illumination light beams in the region of the entry pupil.

5. The illumination apparatus according to claim 4, wherein the at least one adjuster:
   a. for adjusting the distance and/or the positions of the partial illumination light beams, has at least one beam-deflecting element that is adjustable with respect to the deflection angle, and/or
   b. for adjusting the distance and/or the positions of the partial illumination light beams, has at least one tiltably-mounted and/or remote-controlled, motor-movable mirror, and/or
   c. for adjusting the distance and/or the positions of the partial illumination light beams, has at least one tiltably-mounted and/or remote-controlled, motor-movable grating, and/or
   d. adjusting the distance and/or the positions of the partial illumination light beams, has at least one active optical element, and/or
   e. for adjusting the distance and/or the positions of the partial illumination light beams, has at least one active optical element which is designed as an SLM (spatial light modulator) or as a DMD (digital micromirror device), and/or
   f. for adjusting the distance and/or the positions of the partial illumination light beams, has at least one acousto-optical component, and/or
   g. for adjusting the distance and/or the positions of the partial illumination light beams, has at least one acousto-optical component designed as an AOD (acousto-optical deflector), and/or
   h. for adjusting the distance and/or the positions of the partial illumination light beams, has at least one acousto-optical component designed as an AOM (acousto-optical modulator), and/or
   i. for adjusting the distance and/or the positions of the partial illumination light beams, has an AOTF (acousto-optical tunable filter) which is controllable such that, by changing the polarization of the first diffraction order relative to the zeroth diffraction order, a following polarization-dependent phase delay by a birefringent material is effected, and/or
   j. for adjusting the distance and/or the positions of the partial illumination light beams, has two diaphragms which are adjustable in terms of their distance and/or in terms of their position or diameter and are arranged in the entry pupil of the illumination objective or in a plane conjugated to the entry pupil, and/or
   k. for adjusting the diameter of the partial illumination light beams, has a beam expander, which is adjustable in a remote-controlled manner with respect to an enlargement, in a beam path of at least one of the partial illumination light beams, and/or
   l. for adjusting the diameter of the partial illumination light beams, has at least one lens with variable focal length in the beam path of at least one of the partial illumination light beams.

6. The illumination apparatus according to claim 1, wherein the diameter of and the distance between the partial illumination light beams are adapted to one another such that an interference pattern of the two partial beams consists only of two intensity maxima lying symmetrically about a zero point.

7. The illumination apparatus according to claim 1, wherein the partial illumination light beams are collimated in the region of the entry pupil.

8. The illumination apparatus according to claim 1, wherein:
   a. the de-excitation or switching light distribution of the partial illumination light beams interfering in the region of their spatial superposition has a zero point along the optical axis, and/or
   b. the de-excitation or switching light distribution of the partial illumination light beams interfering in the region of their spatial superposition has a zero point along a plane in which the optical axis lies.

9. The illumination apparatus according to claim 1, wherein the partial illumination light beams extend convergently in the region of the entry pupil.

10. The illumination apparatus according to claim 1, wherein the partial illumination light beams in the region of the entry pupil are designed as Gaussian light beams, or are designed as flat top beams.

11. The illumination apparatus according to claim 1, wherein the at least one phase influencer is arranged in the beam path of one of the partial illumination light beams.

12. The illumination apparatus according to claim 1, wherein:
   a. the at least one phase influencer and the beam splitter are formed by the same optical component, and/or
   b. the at least one phase influencer and the beam splitter are formed by the same optical component, wherein the optical component causes both the division of the primary illumination light beam into the two partial illumination light beams and the relative phase offset of the partial illumination light beams with respect to one another.

13. The illumination apparatus according to claim 1, wherein the beam splitter comprises:
    a. at least one grating, and/or
    b. at least one phase grating, and/or
    c. a binary grating, and/or
    d. a superposition grating which corresponds to a superposition of two gratings blazed and/or oriented in opposite directions with regard to their phase delay distribution, and/or
    e. a grating adjustable with regard to the grating period.

14. The illumination apparatus according to claim 13, wherein the primary illumination light beam is arranged relative to the grating such that the partial illumination light beams have a phase offset of $\pi$.

15. The illumination apparatus according to claim 1, wherein the partial illumination light beams are respectively circular in cross-section in the region of the sample and/or in the region of the entry pupil.

16. The illumination apparatus according to claim 1, wherein the partial illumination light beams in the region of the sample and/or in the region of the entry pupil are formed, in cross-section, elliptically and/or astigmatically and/or as a light sheet.

17. A microscope comprising the illumination apparatus according to claim 1.

18. The microscope according to claim 17, wherein the light source or a further light source is configured to produce at least one excitation light beam for illuminating the sample.

19. The microscope according to claim 18, wherein the excitation light beam is spatially and/or temporally superposed with the de-excitation or switching light distribution in the region of the sample.

20. A method for super-resolution imaging of the sample using the microscope according to claim 19, the method comprising:

causing fluorescence excitation of the sample using the excitation light beam, while a stimulated emission, and/or a ground state depletion, and/or a conformity change, and/or a switching of fluorophores is caused with the de-excitation or switching light distribution.

21. The method according to claim 20, wherein the orientation and/or the position of the de-excitation or switching light distribution relative to the sample and/or relative to the optical axis of the illumination objective is adjusted by adjusting the position of the partial illumination light beams relative to one another and/or relative to the entry pupil.

22. The method according to claim 20, wherein a width of a central intensity minimum of the de-excitation or switching light distribution is adjusted by adjusting the distance between the partial illumination light beams in the entry pupil of the illumination objective.

23. The microscope according to claim 18, wherein:
    a. the microscope is designed as an SPIM (selective plane illumination microscopy) microscope, and/or
    b. the excitation light beam is formed as an excitation light sheet and the de-excitation or switching light distribution has two de-excitation or switching light sheets, which are respectively parallel to the excitation light sheet and arranged on both sides of the excitation light sheet.

24. The microscope according to claim 23, further comprising a detection objective having an optical axis aligned perpendicularly to the plane of the excitation light sheet.

* * * * *